W. L. EXLEY AND L. PEMBERTON.
CAR SEAL.
APPLICATION FILED FEB. 18, 1920.
1,356,976.
Patented Oct. 26, 1920.
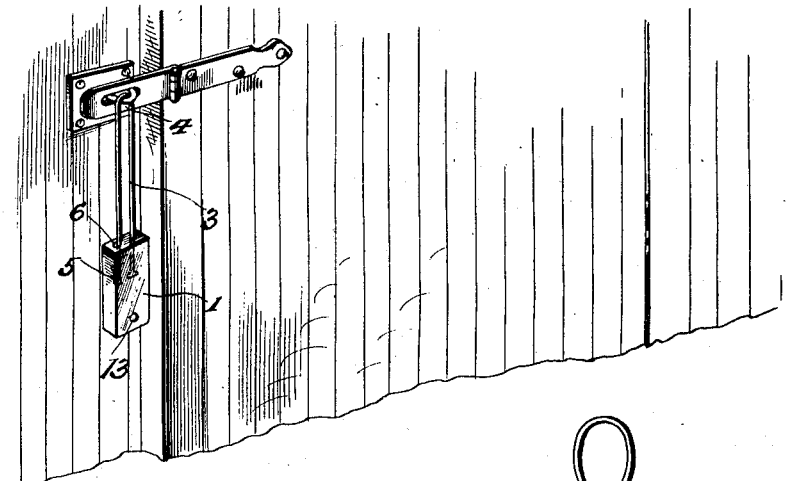
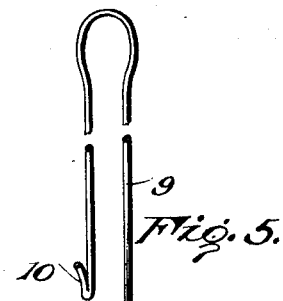
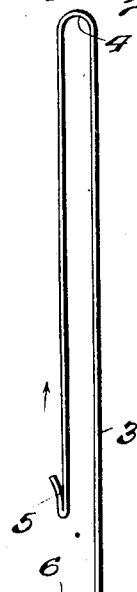
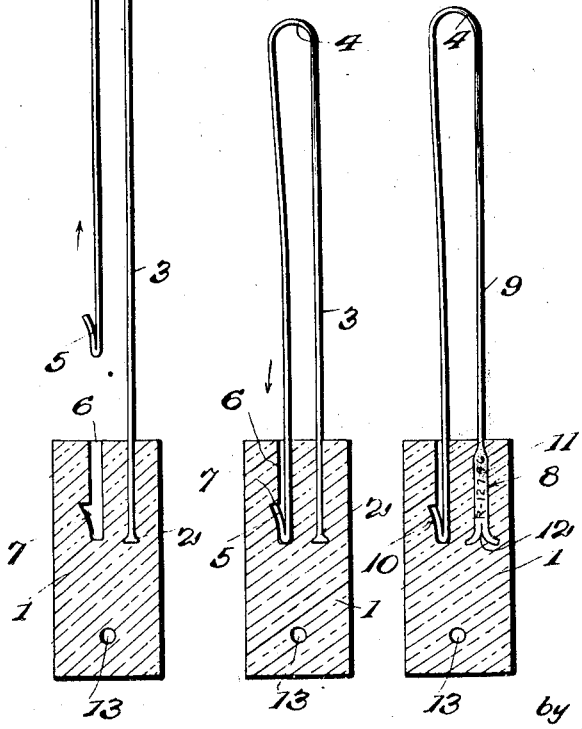
Inventors
William L. Exley
Lemuel Pemberton
by Lacey & Lacey, their Attys

UNITED STATES PATENT OFFICE.

WILLIAM L. EXLEY AND LEMUEL PEMBERTON, OF CHICKASHA, OKLAHOMA.

CAR-SEAL.

1,356,976.      Specification of Letters Patent.      Patented Oct. 26, 1920.

Application filed February 18, 1920. Serial No. 359,637.

*To all whom it may concern:*

Be it known that we, WILLIAM L. EXLEY and LEMUEL PEMBERTON, citizens of the United States, residing at Chickasha, in the county of Grady and State of Oklahoma, have invented certain new and useful Improvements in Car-Seals, of which the following is a specification.

This invention relates to a car seal, the object of which is to provide a seal which is so constructed as to eliminate the possibility of the seal being reapplied after it has once been used.

The invention also contemplates the provision of a seal which is so constructed that the anchored end of a sealing tang carries identifying insignia visible through the anchoring means, whereby such insignia, while visible, is nevertheless not subject to erasure, eradication or alteration as is the case with the usual lead seal bearing an impressed member.

A further object of the invention is to provide a seal having a frangible base anchoring one end of a sealing tang, the remaining portion of which is adapted to be looped over and its terminus bent back to form a spring pawl for positive locking engagement in a terminus receiving pocket formed in the frangible base.

Another object of the invention is to provide the base of the seal with a passage for receiving the tang of another seal whereby a group of seals may be linked together for forming a convenient package for transport. Thus a man may link several dozen seals together and carry them on his arm ready for use, it only being necessary to detach the tang of the one seal from the base of the next seal.

In the drawings:

Figure 1 is a perspective view of a car door with the seal applied;

Fig. 2 is a view of the seal in longitudinal section with the tang in the position and condition it remains in previous to use;

Fig. 3 is a view similar to Fig. 2 but with the tang inserted for locking.

Fig. 4 is a view similar to Fig. 3 but with a modified form of molded-in tang butt;

Fig. 5 is a perspective view of the unsealed car seal shown in Fig. 4.

In detail: The car seal as shown in Figs. 1 to 3 inclusive comprises a frangible base 1 of glass or the like and which has molded thereinto the butt length 2 of a sealing tang 3, said sealing tang being looped over as shown at 4 to provide a bail having the end 5 thereof turned back on itself at an acute angle to form a spring snap pawl which is adapted to be inserted in a pocket 6 formed in the base 1. The pocket 6 is of sufficient diameter to receive the spring snap pawl 5 and at its base portion is widened as at 7 to provide a snap pawl engaging abutment which, after the spring snap pawl 5 has been once engaged or seated in the base of the pocket is positively located against withdrawal therefrom. In this manner, it will be seen that a car once sealed as shown in Fig. 1, by inserting the bail formed by the sealing tang 3 through the bail of the locking hasp, cannot be unsealed without breaking the base 1 and requiring that the car seal be replaced by a completely new seal.

In the modification of the seal shown in Figs. 4 and 5 the molded-in base 8 of the sealing tang 9 having the spring snap pawl 10 formed as just previously described in connection with Figs. 1 to 3, carries identifying insignia 11 which, due to the transparency of the glass of which the base 1 is formed, is visible through said base. In order to positively secure the base 8 of the tang against release from the glass base 1, said base is split or bifurcated as shown at 12 which securely anchors said base 8 in place within the frangible base 1.

The identifying insignia 8 may comprise the car order number, the routing number, the station number or any other desirable insignia used by the railroad company adopting the seal.

The base 1 of each seal carries a passage 13 through which the sealing tang of another seal may be inserted for the purpose of linking a series of the seals together for carrying. These passages are of sufficient size to permit the easy insertion and withdrawal of the spring snap pawl 5.

Having thus described the invention, what is claimed as new is:

1. A car seal including a base provided with a molded-in sealing tang adapted to carry identifying insignia visible through said base, and fastening means.

2. A car seal including a base provided with a permanently affixed sealing tang adapted to carry identifying insignia visible through said base, and fastening means.

3. A car seal including a transparent base provided with a permanently affixed sealing tang adapted to carry identifying insignia visible through said base, and fastening means.

4. A car seal including a frangible transparent base having a molded-in sealing tang carrying identifying insignia visible through said base, the free end of said tang coöperating with the base to form a positively locked bail on engagement of the two.

In testimony whereof we affix our signatures.

WILLIAM L. EXLEY. [L. S.]
LEMUEL PEMBERTON.